United States Patent Office 3,458,604
Patented July 29, 1969

3,458,604
POLYETHYLENE COMPOSITIONS
Rex Percival Palmer, Datchworth, Knebworth, England, assignor to Imperial Chemical Industries Limited, London, England, a corporation of Great Britain
No Drawing. Filed Apr. 21, 1967, Ser. No. 632,557
Claims priority, application Great Britain, May 11, 1966, 20,817/66
Int. Cl. C08f *37/18*
U.S. Cl. 260—897                                    10 Claims

ABSTRACT OF THE DISCLOSURE

Nucleated polymer compositions comprising polyethylene and from 0.01% to 10%, by weight of the composition, of isotactic polypropylene, itself nucleated, preferably with a second α-olefine, e.g. 3-methyl butene-1.

---

This invention relates to compositions comprising high pressure polyethylene.

In the term "polyethylene" I include the normally solid homopolymers of ethylene and normally solid polymers of ethylene containing modifiers, including modifiers copolymerisable with ethylene, in amounts insufficient to destroy the well known tough, waxy, non-rubbery nature of the polyethylene. By "high pressure polyethylene" I mean such polymers prepared by polymerising ethylene in the presence or absence of a comonomer or other modifier, at pressures above 500 atmospheres and in the presence of a free-radical producing catalyst, such polyethylene generally, but not necessarily, having a density below about 0.935 gm./cc.

It is known that the crystallinity in polyethylene may be nucleated by the addition of minor proportions of other polymers, nucleation resulting in a reduction of spherulite size in the polymer and consequent advantages, particularly that of increased light transmission. The addition of minor proportions of polypropylene has been tried for this purpose, but it has been found that nucleation is lost at fabrication temperatures above the melting point of polypropylene.

It is an object of the present invention to provide improved nucleated high pressure polyethylene compositions and methods of preparing them.

In accordance with the present invention we provide a polymer composition comprising high pressure polyethylene and from 0.01% to 15%, by weight of the composition, of a polymer of propylene which is either isotactic polypropylene or a crystalline copolymer of propylene and ethylene containing at least 1%, and preferably at least 5%, by weight, of propylene, said polymer of propylene being itself nucleated with a further component.

The nucleating component is preferably a polymerised α-olefine whereof the homopolymer has a crystalline melting point above 180° C. and preferably above 300° C. Alternatively the nucleating component may be another nucleating additive the effect of whose addition is to reduce the spherulite size in the propylene polymer to less than 2μ, the spherulite size in the unnucleated polypropylene being of the order of 15μ. Suitable additives for the purpose include organic acids and anhydrides as described in U.K. specifications Nos. 951,158 and 1,001,709, and salts of the substituted benzoic acids described in the latter specification. The nucleating additive is preferably present in an amount of at least 0.01% by total weight of the nucleated propylene polymer.

Methods of preparing isotactic polypropylene nucleated with a second polymerised α-olefine are described in U.K. specification 1,030,797, which claims a polymer composition comprising isotactic polypropylene and containing polymer units of a second α-olefine the homopolymer of which melts above 180° C. (preferably above 300° C.) said composition containing at least 70% of propylene monomer units by weight of the polymer forming the composition. A similar method may be used for preparing ethylene/propylene copolymers nucleated with a third olefine. The nucleated propylene polymer so produced may be a true block copolymer (that is, a material containing linked segments of polymer chains derived from the component monomers); or it may be a blend of the homopolymers or it may be a mixture of homopolymers and block coplymer in any proportions. It is not easy to distinguish between these possibilities by experimental tests; but this is a theoretical matter, irrelevant to the operation of my invention and to the advantages it may provide.

The α-olefine used to nucleate the propylene polymer in the preferred compositions is preferably 3-methyl butene-1 or 3-methyl pentene-1. The nucleated propylene polymer preferably contains 0.01% to 10%, by weight, of the nucleating α-olefiine; propylene polymers nucleated by the addition of from about 0.6% to 6% of the nucleating polymeric α-olefine have been found to be particularly effective for nucleating the polyethylene. The nucleated propylene polymer is preferably added to the polyethylene in amounts such as to provide a composition in accordance with the invention that contains from 0.05% to 5% of the nucleated propylene polymer, by total weight of the composition.

Isotactic polypropylene itself is only of limited use as a nucleating agent for high pressure polyethylene, since the effect of nucleation is lost in the subsequent fabrication of the polyethylene at temperatures above that of the polypropylene melting point; temperatures normally used in the fabrication of polyethylene by the conventional techniques of moulding and extrusion are in fact frequently well above the polypropylene melting point. Poly-3-methyl butene-1 or poly-3-methyl pentene-1 are found by themselves to have only a small nucleating activity when added to high pressure polyethylene. It is thus surprising that high pressure polyethylene can be satisfactorily nucleated by the addition of a propylene polymer which has itself been nucleated with 3-methyl butene-1, 3-methyl pentene-1, or other second α-olefine in polymeric form, or by another suitable nucleating agent such as sodium benzoate.

The polyethylene may be nucleated in accordance with the invention by blending the previously nucleated propylene polymer with the polyethylene by any known blending technique. For example, the materials may be mixed by melt-blending them together at a temperature above the softening temperature of the propylene polymer, preferably at a temperature of from 185° to 200° C. This method is generally preferred for convenience and low cost, but other methods, for example that of mixing dispersions of the polymers and subsequently removing the dispersant, can be used satisfactorily. Melt blending may conveniently be carried out on a roll mill or in a Banbury or similar mixer.

By the addition of the nucleated propylene polymer to polyethylene in accordance with the invention I have found it possible to achieve spherulite sizes of less than 1 micron in the polyethylene, with visible light transmissions as high as 38% with samples 0.8 mm. thick.

The compositions of the invention, because of their high transparency, are particularly useful for fabrication into films, sheets and mouldings. Another field in which they are particularly useful, because of their property of uniform crystallisation, is in processes where slow cooling is involved, such as in applying cable insulation, particularly submarine telephone cable insulation. As indicated, the compositions are particularly useful for poly-3-methyl butene-1 in reducing the spherulite size and increasing the light transmission of the polyethylenes.

TABLE 1

| Example | Disc Cooling | Polyethylene, M.F.I. | Nucleated Polypropylene Content (Percent) | Unnucleated Polypropylene Content (Percent) | Poly-3-methyl butene-1 content (Percent) | Spherulite size (μ) | Transmission (Percent) |
|---|---|---|---|---|---|---|---|
| 1 | Slow | 0.32 | | | | 15 | 0.02 |
| | Slow | | 1.0 | | | 1 | 28.0 |
| | Slow | | | 1.0 | | 10 | 0.26 |
| | Fast | | | | | 10 | 0.14 |
| | Fast | | 1.0 | | | <1 | 38.0 |
| | Fast | | | 1.0 | | 8 | 0.7 |
| 2 | Slow | 0.12 | | | | 5 | 1.4 |
| | Slow | | 1.0 | | | <1 | 26.0 |
| | Slow | | | 1.0 | | 5 | 3.5 |
| | Fast | | | | | 2 | 10.0 |
| | Fast | | 1.0 | | | <1 | 24.0 |
| | Fast | | | 1.0 | | 2 | 13.0 |
| 3 | Slow | 0.15 | | | | 8 | 0.5 |
| | Slow | | 1.0 | | | 2 | 26.0 |
| | Fast | | | | | 4 | 5.0 |
| | Fast | | 1.0 | | | <1 | 36.0 |
| 4 | Slow | 0.2 | | | | 7 | 2.0 |
| | Slow | | 1.0 | | | 3 | 19.0 |
| | Fast | | 1.0 | | | 2 | 10.0 |
| | Fast | | 1.0 | | | <1 | 26.0 |
| 5 | Slow | 2.0 | | | | 18 | 0.1 |
| | Slow | | 1.0 | | | 3 | 20.0 |
| | Slow | | | | 1.0 | 6 | 0.09 |
| | Fast | | | | | 10 | 0.2 |
| | Fast | | 1.0 | | | <1 | 23.0 |
| | Fast | | | | 1.0 | 5 | 0.3 | forming into shaped article at temperatures above the melting point of the propylene polymer: that is, at temperatures above about 175° C.

My invention is illustrated but in no way limited by the following examples, in which all parts given are by weight.

Average spherulite sizes were measured using a polarising microscope and a National Physical Laboratory calibrated graticule. Light transmissions were measured by ASTM Test D 1746–62T, using dimethyl phthalate as an immersion medium to blank out scattering by surface imperfections.

The melt flow indices of the polyethylenes were measured by the method of BS 2782 (ASTM D 1238–57T).

EXAMPLES 1 TO 5

A series of high pressure polyethylene samples containing 0.1% of antioxidant were obtained, and three portions of each (in Examples 1 and 2) were milled on rolls at 180° to 190° C. until the polyethylene had softened. To one portion was added 1.0% of unnucleated isotactic polypropylene, to another 1.0% of isotactic polypropylene which had been nucleated with 6% of 3-methyl butene, and the third was left without additive. Milling of the three samples at 180° to 190° C. was continued until thorough incorporation of the additive had been achieved. Other samples (Examples 3 and 4) of polyethylene containing 0.1% of antioxidant were divided into two parts and similarly treated, one without additive and one with the addition of 1.0% of the nucleated polypropylene. Another sample (Example 5) was divided into three parts, of which one was treated without additive, one with the addition of 1.0% of nucleated polypropylene, and one with 1.0% of poly-3-methyl butene-1.

Portions of the treated and untreated samples were moulded into 0.8 mm. thick discs by pressing them at 190° C. for 10 minutes. Some of the discs were cooled quickly to reach room temperature throughout in 7 minutes, and some were cooled slowly over 12 hours.

The spherulite size and visible light transmission of the samples were measured. The results are given in Table 1; they indicate the effectiveness of the nucleated polypropylene, compared with unnucleated polypropylene and

EXAMPLE 6

A composition comprising a high pressure polyethylene (melt flow index 2) with 1% of polypropylene nucleated with 6% of polymeric 3-methyl butene was prepared by a solution-dispersion technique, by adding the polyethylene and polypropylene to xylene at 135° C. to form a 1% solution, stirring the solution for about 5 hours, running it into excess methanol, and filtering off and drying and resulting precipitate.

A portion of the same polyethylene without nucleating additive was treated in similar manner.

Samples of the treated and untreated polyethylene were moulded into discs and tested in the manner described for Examples 1 to 5, at a moulding temperature of 190° C., with the results given in Table 2.

TABLE 2

| Disc Cooling | Nucleated Polypropylene Content (Percent) | Spherulite Size (μ) | Transmission (Percent) |
|---|---|---|---|
| Slow | | 15 | <0.01 |
| Slow | 1.0 | <1 | 17.0 |
| Fast | | 10 | 0.04 |
| Fast | 1.0 | <1 | 19.0 |

In some further experiments samples of the high pressure polyethylene mixed with 1% of the nucleated polypropylene and samples mixed with 1% of unnucleated polypropylene were milled at a temperature of 190° C. and moulded into discs at 160° C. The size of the spherulites and the percentage transmission of the discs showed no significant difference between the two series of samples. This moulding temperature, however, was well below the processing temperatures frequently required for fabricating polyethylene by moulding or extrusion techniques.

EXAMPLES 7 TO 11

Portions of various additives were incorporated into a series of high pressure polyethylene samples, containing 0.1% of antioxidant, by the method described in Example 1. Portions of treated and untreated samples were similarly moulded into 0.8 mm. thick discs, some of which were cooled quickly and some slowly, in the manner described.

Details of the additives and of their effect on spherulite size and light transmission in the samples are given in Table 3.

Example 7 illustrates the effect of varying the percentage of a nucleating agent in the polyethylene, the nucleating agent being polypropylene nucleated with polymeric 3-methyl butene-1 (3MB);

Example 8 shows the effect of nucleated polypropylenes with differing melt flow indices (MFI) and different 3-methyl butene-1 content;

Example 9 shows the effect of an ethylene (Eth)/propylene (PP)/3-methyl butene-1 (3MB) terpolymer nucleating agent;

Example 10 shows, for comparison with the results obtained by using a method in accordance with this invention, the results of adding an ethylene/3-methyl butene-1 block copolymerisation product, without any propylene present; and Example 11 compares the effect nucleating the polyethylene by the addition polypropylene nucleated with either 3-methyl butene-1 or 3-methyl pentene-1 (3MP).

TABLE 3

| Example | Disc cooling | Polyethylene, M.F.I. | Nucleating addititives and amounts, percent based on weight of polyethylene and additive | Spherulite size ($\mu$) | Transmission, percent (0.8 mm.) |
|---|---|---|---|---|---|
| Polypropylene Nucleated With 6% 3MB | | | | | |
| 7 | Slow | 2 | Nil | 18 | 0.015 |
| | Slow | | 0.05% | ~4 | 1.6 |
| | Slow | | 0.1% | ~4 | 2.3 |
| | Slow | | 0.5% | ~1 | 9.3 |
| | Slow | | 5.0% | 2 | 13.0 |
| | Slow | | 10.0% | 2 | 11.0 |
| | Slow | | 15.0% | 4 | 10.0 |
| | Slow | | 50% | ~10 | 0.017 |
| | Fast | | Nil | 12 | 0.012 |
| | Fast | | 0.05% | ~3 | 1.4 |
| | Fast | | 0.1% | ~3 | 2.3 |
| | Fast | | 0.5% | ~2 | 8.6 |
| | Fast | | 5.0% | ~1 | 1.8 |
| | Fast | | 10.0% | ~2 | 1.6 |
| | Fast | | 15.0% | ~2 | 11.5 |
| | Fast | | 50% | ~5 | ---- |

1% of Polypropylene Nucleated With 3MB

| Example | Disc cooling | Percent 3MP in nucleating agent | MFI nucleating agent | | |
|---|---|---|---|---|---|
| 8 | Slow | 0.7 | Nil | | 15 | 0.011 |
| | Slow | | 6.0 | 0.47 | ~1 | 24 |
| | Slow | | 5.4 | 9.0 | ~1 | 21 |
| | Slow | | 0.8 | 15.0 | <1 | 21 |
| | Slow | | 1.3 | 15.0 | ~1 | 20 |
| | Slow | | 3.9 | 16.0 | <1 | 20 |
| | Fast | | Nil | | 1.0 | 0.024 |
| | Fast | | 6.0 | 0.47 | <1 | 29 |
| | Fast | | 5.4 | 9.0 | <1 | 23 |
| | Fast | | 0.8 | 15.0 | <1 | 28 |
| | Fast | | 1.3 | 15.0 | <1 | 28 |
| | Fast | | 3.9 | 16.0 | <1 | 27 |

1% of Ethylene/Propylene Copolymer Nucleated With 3MB

| Example | Disc cooling | Percent PP | Eth | 3MB | MFI | | |
|---|---|---|---|---|---|---|---|
| 9 | Slow | 0.7 | 91.2 | 8 | 0.8 | 1.2 | ~1 | 21 |
| | Slow | | 5 | 94 | 1.0 | 0.06 | ~1 | 15 |
| | Fast | | 91.2 | 8 | 0.8 | 1.2 | <1 | 27 |
| | Fast | | 5 | 94 | 1.0 | 0.06 | <1 | 28 |

1% of Ethylene/3MB Block Copolymer: Ziegler Catalyzed

| | | | Percent 3MB | | |
|---|---|---|---|---|---|
| 10 | Slow | 2 | 14 | 12 | 0.01 |
| | Slow | | Nil | 15 | 0.011 |
| | Fast | | 14 | 6 | 0.11 |
| | Fast | | Nil | 8 | 0.034 |

1% of Polypropylene Nucleated With 3MB or 3MP

| | | | 3MB or 3MP | MF1 | | |
|---|---|---|---|---|---|---|
| 11 | Slow | 2 | Nil | | 15 | 0.01 |
| | Slow | | 0.6% 3MB | 20 | 3 | 6.3 |
| | Slow | | 0.6% 3MP | 1.3 | 1.2 | 9.0 |
| | Slow | | 0.6% 3MP | 6 | ~2 | 5.2 |
| | Fast | | Nil | | 8 | 0.06 |
| | Fast | | 0.6% 3MB | 20 | <2 | 7.4 |
| | Fast | | 0.6% 3MP | 1.3 | ~1 | 11.0 |
| | Fast | | 0.6% 3MP | 6 | ~2 | 8.2 |

I claim:

1. A polymer composition comprising high pressure polyethylene and from 0.01% to 15%, by weight of the composition, of a polymer of propylene which is either isotactic polypropylene or a crystalline copolymer of propylene and ethylene containing at least 1%, by weight, of propylene, said polymer of propylene being itself nucleated with homopolymerized units of a branched α-mono-olefine having a crystalline melting point above 180° C.

2. A composition as claimed in claim 1 in which said branched α-olefine homopolymer has a crystalline melting point above 300° C.

3. A composition as claimed in claim 1 in which said branched α-olefine is 3-methyl butene-1 or 3-methyl pentene-1 and said nucleated polymer of propylene contains from 0.6% to 6.0%, by weight of said branched α-olefine.

4. A composition as claimed in claim 1 in which the nucleated polymer of propylene contains from 0.01% to 10%, by weight, of said branched α-olefine.

5. A composition as claimed in claim 1 in which the nucleated polymer of propylene contains from 0.6% to 6.0%, by weight, of said branched α-olefine.

6. A composition as claimed in claim 1 that contains from 0.05% to 5.0%, by weight, of the nucleated polymer of propylene.

7. A plastics film formed of a composition as claimed in claim 1.

8. A plastics foulding of a composition as claimed in claim 1.

9. An electrically insulated cable provided with insulation comprising a composition as claimed in claim 1.

10. A method of forming a shaped article of a composition as claimed in claim 1, in which the composition is heated to a temperature above 175° C.

References Cited

UNITED STATES PATENTS 3,327,020   6/1967   Binsbergen _____ 260—878

FOREIGN PATENTS 677,933   1/1964   Canada.

MURRAY TILLMAN, Primary Examiner

C. J. SECCURO, Assistant Examiner

U.S. Cl. X.R.

117—128.7; 260—78.4, 93.7